United States Patent [19]
McKim

[11] Patent Number: 5,441,241
[45] Date of Patent: Aug. 15, 1995

[54] KNUCKLE FOR WELDING OF SAFETY HAND RAILINGS

[76] Inventor: Alan M. McKim, 2540 Rivers Bend Lane, Oakville, Ontario, Canada, L6L 1V3

[21] Appl. No.: 105,115
[22] Filed: Aug. 12, 1993
[51] Int. Cl.⁶ .............................................. E04H 17/14
[52] U.S. Cl. ........................................ 256/65; 403/13; 403/265; 403/270; 403/403
[58] Field of Search ................ 403/13, 265, 270, 271, 403/272, 403; 256/65; 228/138, 153, 154; 148/519, 521

[56] References Cited

U.S. PATENT DOCUMENTS

| Re. 6,488 | 6/1875 | Van Duzer | 403/265 |
| 1,881,979 | 10/1932 | Taylor | 403/272 |
| 3,411,813 | 11/1968 | Kreuz | 403/13 |
| 3,891,332 | 6/1975 | Molyneux et al. | 403/13 |
| 4,188,140 | 2/1980 | Clemens et al. | 403/13 |
| 4,583,755 | 4/1986 | Diekman et al. | 403/13 |
| 5,190,207 | 3/1993 | Peck et al. | 403/272 |

FOREIGN PATENT DOCUMENTS

| 823012 | 1/1938 | France | 403/272 |
| 2214232 | 10/1973 | Germany | 403/272 |
| 3736812 | 1/1989 | Germany | 403/270 |

OTHER PUBLICATIONS

"Railing Systems & Components", R & B Wagner Inc., 8 page pamphlet, 05720/WAG, BuyLine 3875, Date Unknown.

Primary Examiner—Richard A. Bertsch
Assistant Examiner—Howard R. Richman
Attorney, Agent, or Firm—R. Craig Armstrong

[57] ABSTRACT

Instead of creating hand railings by joining together sections of rectangular hollow tubing using mitre cuts and welding of the abutting cut ends, a metal knuckle is welded to the straight ends of such tubing. The knuckle has a body with a rectangular cross-section and in profile a circular sector with an included angle less than 180°. Each end of the knuckle is formed as a pyramidal frustum that is adapted to enter the straight end of the tubing. A notch of generally triangular cross-section is created to hold welding bead between an end of the tubing and a respective frustum end of the knuckle. The notch size increases with the thickness of tubing inserted over the frustum end, and filling the notch with welding bead will automatically increase the joint strength as tubing thickness increases.

5 Claims, 5 Drawing Sheets

KNUCKLE FOR WELDING OF SAFETY HAND RAILINGS

The invention relates to welding of safety hand railings, and more particularly, to a knuckle for facilitating the welding of hand railings of rectangular cross-section.

Among other applications, safety hand railings are used on stairs, mezzanine floors, platforms and catwalks. Such railings are often created from sections of pipe, and tend to be both heavy and awkward. In recent years, thin-walled tubing of rectangular cross-section has come into wide use for such railings. Typically, sections of the thin-walled tubing are connected by cutting the ends of the sections at an angle and abutting those ends together in the form of a mitre joint. One problem that arises with the mitre joint is that the sharp line edge formed at the outer end of that joint may present a danger to a person falling against it.

The invention is a metal knuckle that not only obviates the need for creating precise mitre cuts at the ends of the railing sections but also presents a smooth circular end face to a person using the hand railing. One end of a knuckle may be fitted to the end of a railing section prior to its shipment to the final assembly location, resulting in easier and faster assembly of that section with adjacent sections. Another advantage is that the knuckle ends are contoured such that with a knuckle positioned in the end of a railing section, a peripheral V-shaped weld preparation groove between the two components is formed which is always of the correct cross-section to assure maximum welding strength regardless of tubing wall thickness. The V-shape of the groove results in welders of minimum experience creating welds of high quality and full-penetration, and with a flush weld surface. Because of the flush surface of the welds, valuable grinding time is saved in creating a final surface with an appealing finish.

The knuckle body has a rectangular cross-section, and in profile is a circular sector with an included angle of less than 180°. The two ends of the knuckle are each configured as a frustum adapted to enter into a respective one of two sections of railing. The sides of each frustum extend at an angle of approximately 45° to the respective end of the knuckle. The outside dimensions of the knuckle are such that when the knuckle and railing section are connected together, a projection of each outside surface of the knuckle extends generally inline with a respective outside surface of the railing section.

The included angle of the circular sector may be 90°. One of the sides of the knuckle may also be configured as a frustum and be adapted to receive a third railing section. The knuckle may be created by a forge process or by a cast process.

The invention will next be described in terms of several preferred embodiments, utilizing the accompanying drawings in which.

Figure 1:
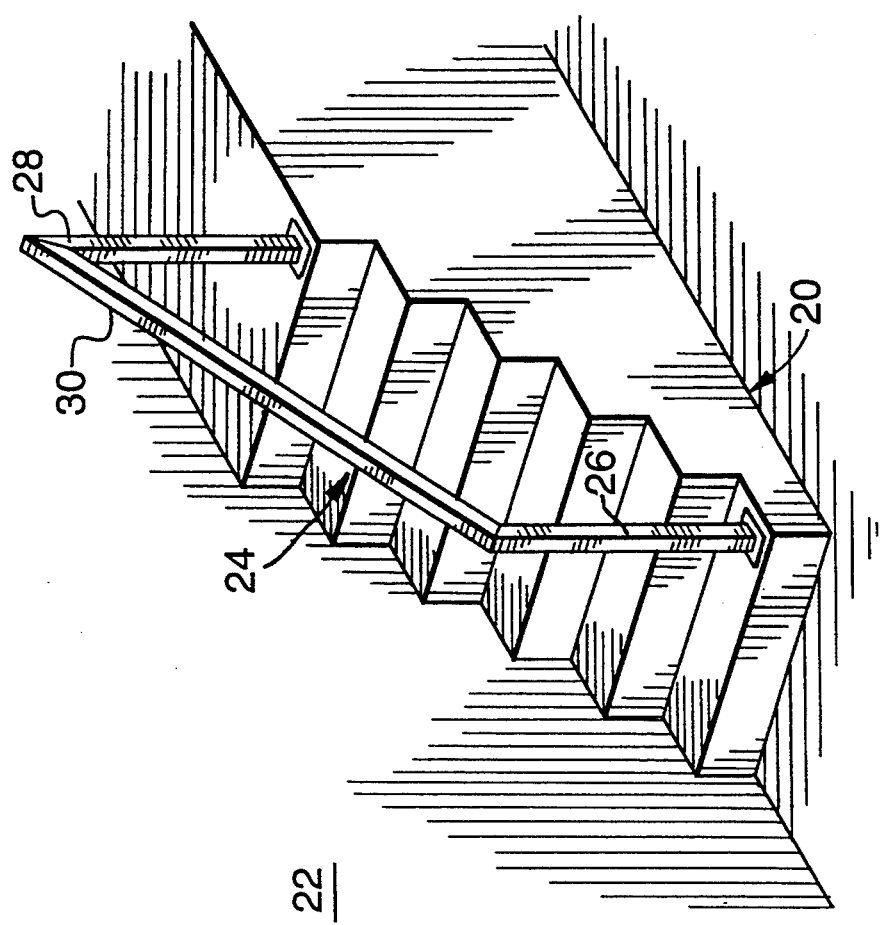
FIG. 1 is a perspective view of a prior art stair railing.

A first preferred embodiment involves the use of the knuckle on a stair railing. FIG. 1 illustrates a set of stairs 20 extending against a wall 22. A prior art form of stair railing generally designated 24 is secured to stairs 20, with a first vertical member 26 and a second vertical member positioned at the bottom and top, respectively, of stairs 20. An inclined member 30 is connected to the upper ends of the vertical members 26 and 28 to extend generally parallel to the edge of the stairs. Stair members 26, 28 and 30 are all formed from thin-walled metal tubing of rectangular cross-section.

The connection between the ends of member 30 and the respective ends of members 26 and 28 involves a mitre cut to those ends, followed by welding along the seam between the abutting ends. With regard to FIG. 1, the connection between members 28 and 30 can create a sharp line edge that may present a danger to a person falling against it.

Figure 2:
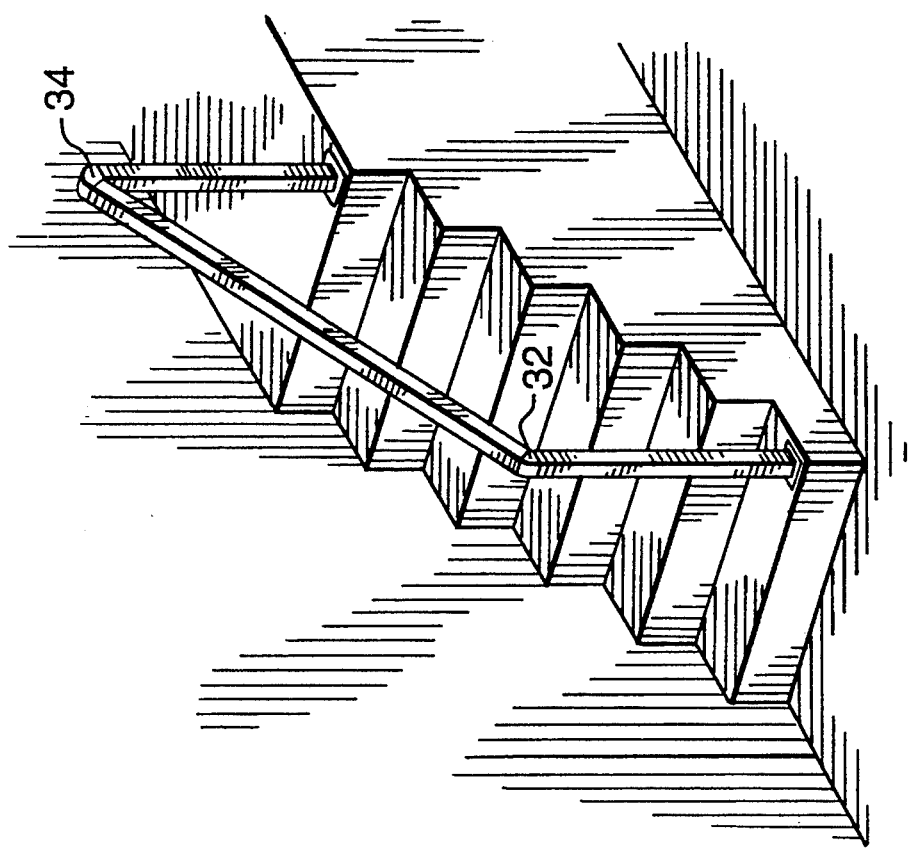
FIG. 2 is a perspective view of a stair railing that utilizes a pair of the metal knuckles of the invention.

FIG. 2 illustrates the connection between the ends of the railing sections that results when two knuckles 32 and 34 of this invention are utilized. Not only does the top knuckle 34 have the advantage of a rounded safer contour, but utilizing the knuckles obviates the need for the mitre cut on the railing sections.

Figure 3:
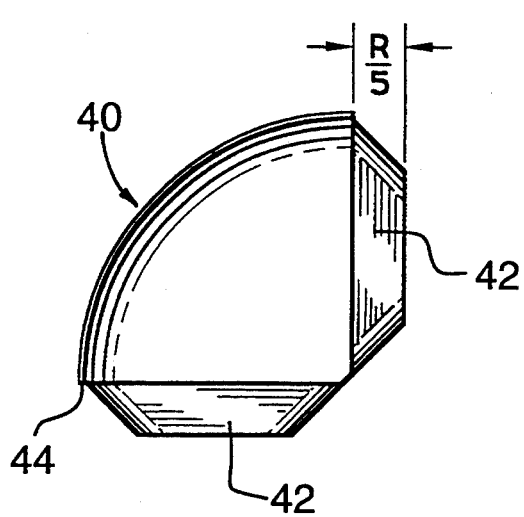
FIG. 3 is a side view of a first embodiment of the metal knuckle of the invention.
Figure 4:
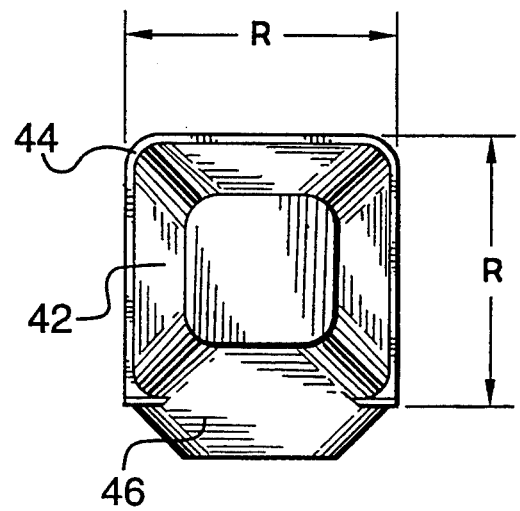
FIG. 4 is an end view of the knuckle of FIG. 3.
Figure 5:
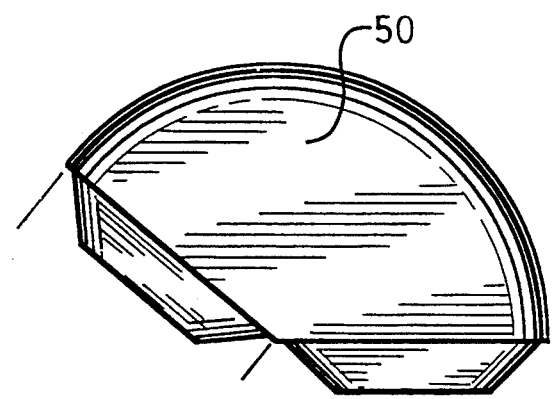
FIG. 5 is a side view of a second embodiment of the metal knuckle of the invention.
Figure 6:
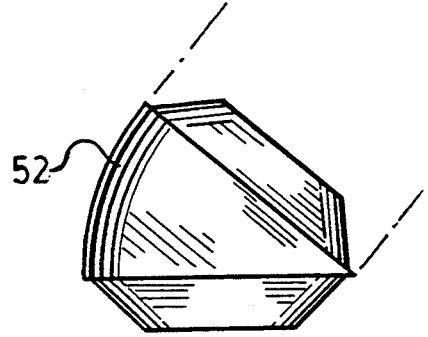
FIG. 6 is a side view of a third embodiment of the metal knuckle of the invention.

FIGS. 3 to 6 illustrate three embodiments of the knuckle. FIGS. 3 and 4 illustrate a side view and an end view, respectively, of a first embodiment 40 of the knuckle used to connect two railing sections at 90° to each other. The embodiment has a radius 'R' which generally corresponds with the width of the tubing of square cross-section that forms the two railing sections. Each end of the knuckle is contoured as a pyramidal frustum 42, with sides at a slope of approximately 1-to-1 and a height equal to approximately R/5. A thin lip 44 extends around the base of each frustum 42 on three sides, with a common diagonal region 46 being on the fourth side. FIG. 5 illustrates a second embodiment 50 of the knuckle used to connect two railing sections at 135° to each other, while FIG. 6 illustrates a third embodiment 52 of the knuckle Used to connect two railing sections at 45° to each other. Knuckles 50 and 52, which both have a pyramidal frustum on each end similar to those on knuckle 40, would correspond to the knuckles 34 and 32, respectively, in FIG. 2 if the set of stairs of that figure were inclined at a 45° angle.

Figure 7:
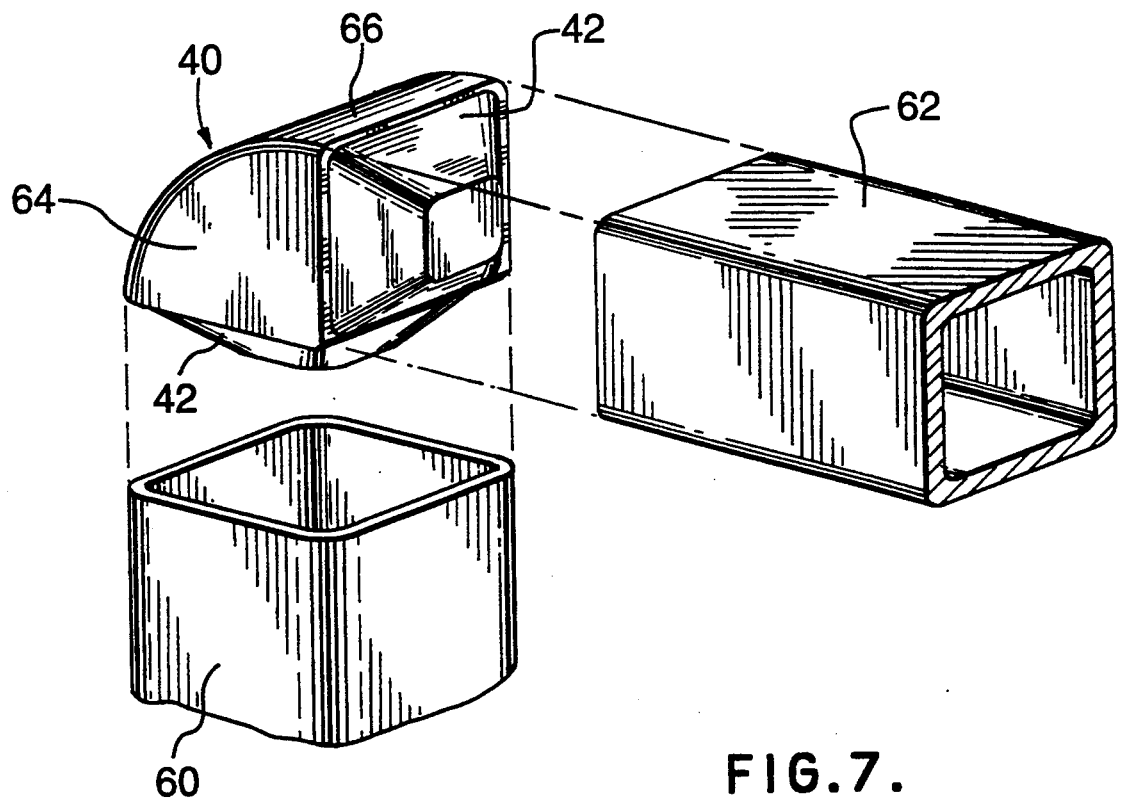
FIG. 7 is a perspective view of the first embodiment of the metal knuckle and two railing sections ready to be brought into abutment with the ends of the knuckle.
Figure 8:
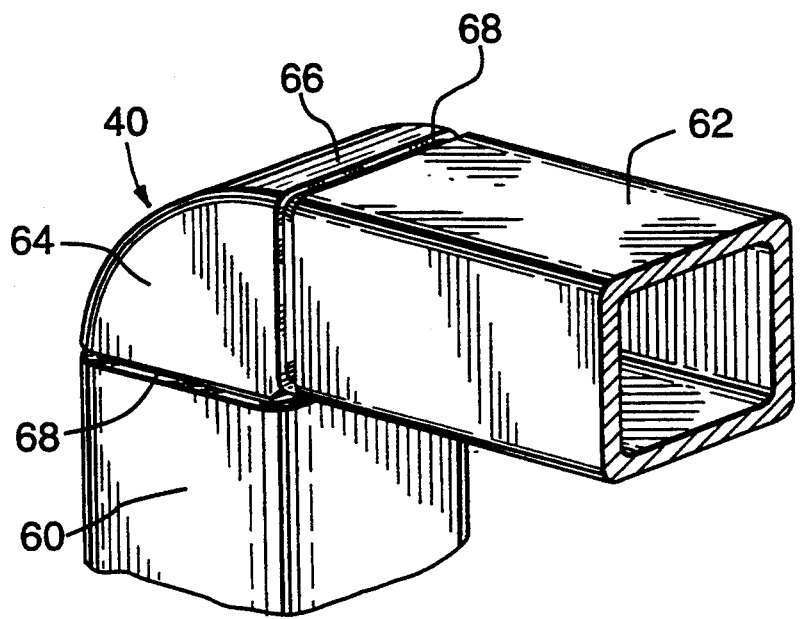
FIG. 8 is a perspective view similar to FIG. 7 but illustrating the two railing sections in abutment with the ends of the knuckle.

FIGS. 7 and 8 are perspective views of two railing sections 60 and 62 prior to, and after, being brought into abutment with the frustums 42 on the end of knuckle 40. Railing sections 60 and 62 are each formed from thin-walled tubing of square cross-section. In FIG. 7, knuckle 40 is seen to have a pair of opposite flat side surfaces 64 and an arcuate outer surface 66. FIG. 8 illustrates a notch 68 of generally triangular cross-section, which is created between railing sections 60 and 62 and the respective ends of knuckle 40. When a railing section 60 or 62 is brought into abutment with a frustum 42 on the end of knuckle 40, the resulting notch 68 is of such a size that when it is filled with weld metal, the weld created has the requisite strength to securely hold the railing section on knuckle 40. As mentioned earlier, one of the sections 60 and 62 would normally be welded to knuckle 40, and the surface of the weld metal ground smooth, before the railing sections are moved to the final assembly site.

Figure 9:
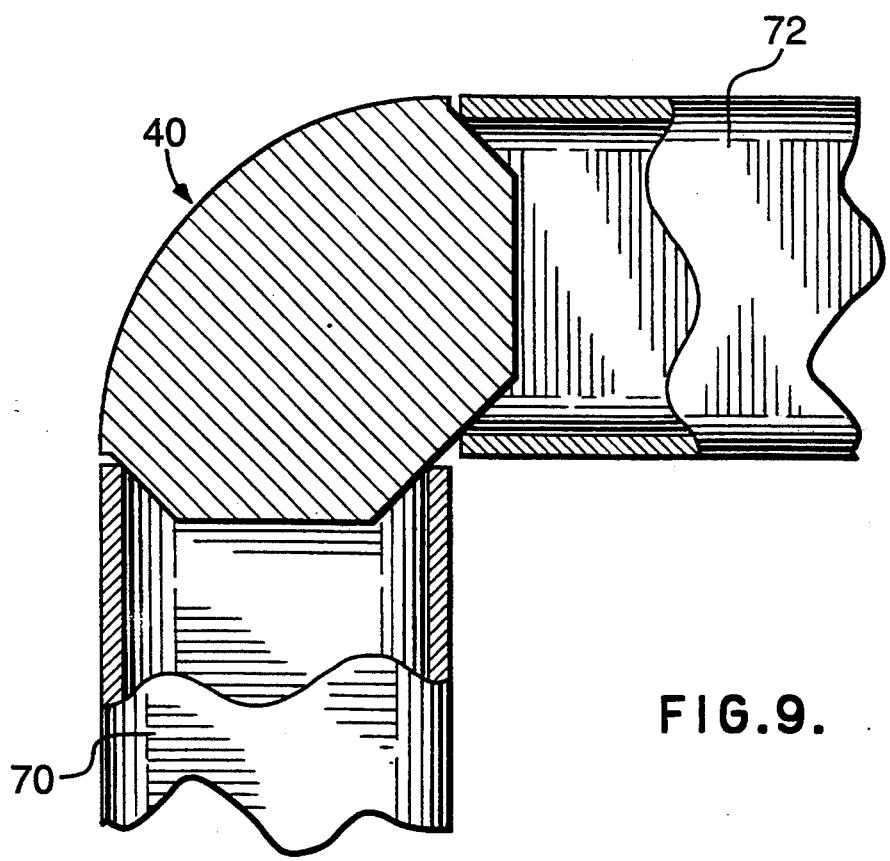
FIG. 9 is a partially-sectioned side view of the first embodiment of the metal knuckle with two railing sections of a first thickness shown abutting the knuckle and ready for welding.
Figure 10:
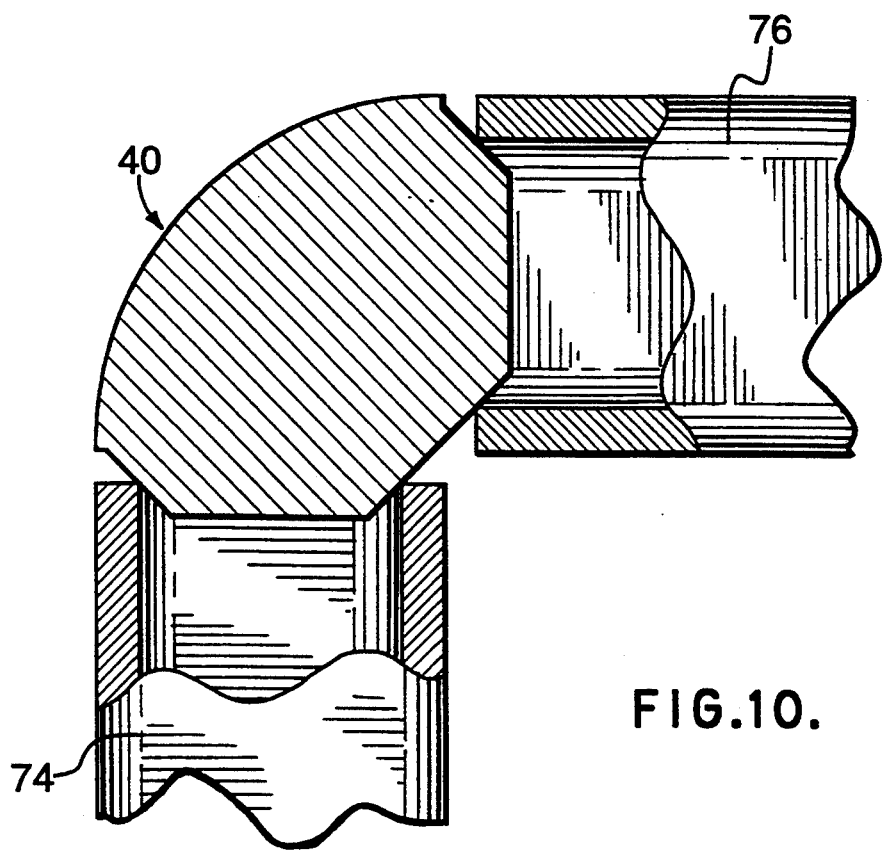
FIG. 10 is a partially-sectioned side view similar to FIG. 9 but illustrating two railing sections of a second thickness ready for welding to the knuckle.
Figure 11:
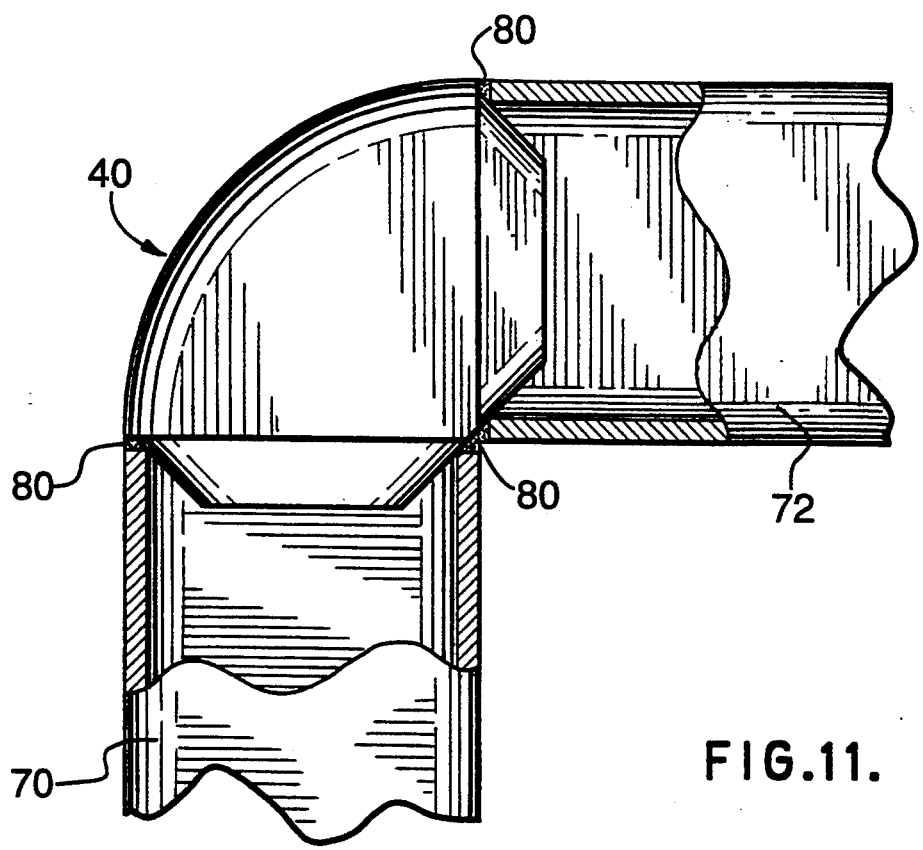
FIG. 11 is a view similar to FIG. 9 but showing the two railing sections welded to the knuckle.
Figure 12:
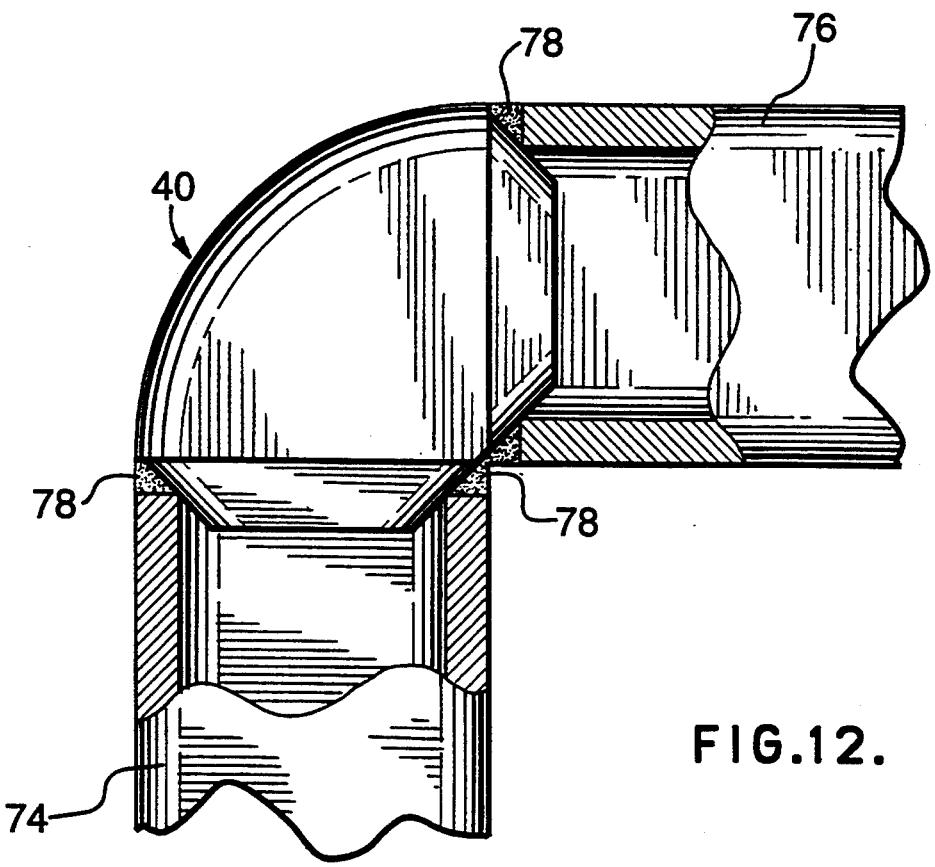
FIG. 12 is a view similar to FIG. 10 but showing the two railing sections welded to the knuckle.

FIGS. 9 to 12 illustrate railing sections formed from two thicknesses of tubing, and the resulting welding bead created with each. In FIGS. 9 and 10, the railing sections are both formed from tubing with a square cross-sectional width of 2 inches; the 2 tubing sections 70 and 72 in FIG. 9 have a thickness of 0.125 inches, while the two tubing sections 74 and 76 in FIG. 10 have a thickness of 0.25 inches. FIGS. 11 and 12 show the correspondingly greater quantity of welding bead 78 that is inserted into the notch created with the 0.25-inch thick tubing sections 74 and 76, when compared to the welding bead 80 inserted into the notch created with the 0.125-inch thick sections 70 and 72. In both cases, after welding the surfaces are ground such that the projection of each side of the tubing extends generally inline with the respective outside surface of the knuckle 40. In the result, the weld created with the 0.25-inch thick tubing section is larger and thus correspondingly stronger than the weld created with the 0.125-inch thick tubing section.

The knuckles of the invention are produced in a cast process in a range of sizes. Besides the mentioned angles of 90°, 45° and 135°, other angles used are 60° and 120°. The knuckles are made for use with square tubing of widths 1 inch, 1.25 inches, 1.5 inches and 2 inches, and thicknesses of 0.125 inches and 0.25 inches. The variety of sizes for the knuckles would simply be a function of demand. As well as being cast, the knuckles could also be produced by a forge process.

Although the knuckles of the preferred embodiment are for use with railing sections of square cross-section, it is of course possible to more generally create knuckles for use with railing sections of rectangular cross-section.

What is claimed as the invention is:

1. A metal knuckle for connecting two sections of hand railing of rectangular cross-section, the knuckle having a solid, non-hollow body with a rectangular cross-section and in profile a circular sector with an included angle less than 180° defined by opposite ends of said body, said knuckle further having frustum portions projecting from said opposite ends, each said frustum portion being configured to enter into a respective one of the two sections of hand railing, the sides of each frustum portion extending at an angle of approximately 45° to the respective end of the body, the knuckle being sized relative to the respective section of hand railing to which it is adapted to be connected such that, when said knuckle and said hand railing sections are in abutment ready to be welded together, a projection of each outside surface of the knuckle extends generally in-line with a respective outside surface of the section of hand railing, and a resultant notch of generally triangular cross-section extending around the knuckle between the end of the knuckle body and the respective section of hand railing defines a space appropriately sized for receiving a welding bead of the necessary strength to hold said knuckle and said hand railing sections together.

2. A metal knuckle as in claim 1, wherein the rectangular cross-section is a square cross-section.

3. A metal knuckle as in claim 1, wherein the knuckle is created by a forge process.

4. A metal knuckle as in claim 1, wherein the knuckle is created by a cast process.

5. A metal knuckle as in claim 1, wherein the included angle of the circular sector is 90°.

* * * * *